United States Patent Office 2,743,274
Patented Apr. 24, 1956

2,743,274

MEROCYANINE DYES CONTAINING THE TRIAZOLO [4,3-A]-QUINOLINE OR TETRAZOLO [A] QUINOLINE NUCLEUS

Leslie G. S. Brooker, Kodak Park, N. Y., assignor to Eastman Kodak Company, Rochester, N. Y., a corporation of New Jersey No Drawing. Application July 8, 1954,
Serial No. 442,180

14 Claims. (Cl. 260—240.4)

This application relates to new merocyanine dyes useful in sensitizing photographic halide emulsions, and methods for making such dyes.

Certain dyes of the merocyanine dye series are known to extend the sensitivity of photographic silver halide emulsions. Dyes which have been found somewhat useful for this purpose include those which contain a quinoline nucleus. Such dyes have been known for some time, although they have not been particularly efficacious for such purposes as sensitizers for photographic emulsions. While such dyes are generally classed as weak sensitizers, I have now found a new class of dyes, some of which possess useful properties in optically sensitizing photographic silver halide emulsions.

The new dyes of the merocyanine series of my invention can advantageously be represented by the following general formula:

I.

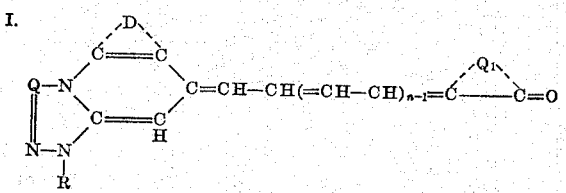

wherein R represents an alkyl group, such as methyl, ethyl, n-propyl, isopropyl, n-butyl, benzyl (phenylmethyl), etc., D represents the non-metallic atoms necessary to complete a carbocyclic, aromatic nucleus of the benzene series, $n$ represents a positive integer of from 1 to 2, Q represents a nitrogen atom or a methine (—CH=) group, and $Q_1$ represents the non-metallic atoms necessary to complete a heterocyclic nucleus containing from 5 to 6 atoms in the heterocyclic ring, such as those of the pyrazoline series (e. g. 3-methyl-1-phenyl-5 - pyrazoline, 1 - phenyl - 5 - pyrazolone, 1 - (2 - benzothiazolyl) - 3 - methyl - 5 - pyrazoline, etc.), those of the isoxazolone series (e. g. 3-phenyl-5(4H)-isoxazolone, 3-methyl-5(4H)-isooxazolone, etc.), those of the oxindole series, (e. g. 1-alkyl-2,3-dihydro-2-oxindoles, etc.), those of the 2,4,6-triketohexahydropyrimidine series (e. g. barbituric acid or 2-thiobarbituric acid as well as their 1-alkyl (e. g. 1-methyl, 1-ethyl, 1-n-propyl, 1-n-heptyl, etc.), or 1,3-dialkyl (e. g. 1,3-dimethyl, 1,3-diethyl, 1,3-di-n-propyl, 1,3-diisopropyl, 1,3-dicyclohexyl, 1,3-di(β-methoxyethyl), etc.), or 1,3-diaryl (e. g. 1,3-diphenyl, 1,3-di(p-chlorophenyl), 1,3-di(p-ethoxycarbonylphenyl), etc.), or 1-aryl (e. g. 1-phenyl, 1-p-chlorophenyl, 1-p-ethoxycarbonylphenyl), etc.) or 1-alkyl-3-aryl (e. g. 1-ethyl-3-phenyl, 1-n-heptyl-3-phenyl, etc.) derivatives), those of the rhodanine series (i. e. 2-thio-2,4-thiazolidinedione series), such as rhodanine, 3-alkylrhodanines (e. g. 3-ethylrhodanine, 3-allylrhodanine, etc.) or 3-arylrhodanines (e. g. 3-phenylrhodanine, etc.), etc., those of the 2(3H)-imidazo[1,2-α]pyridone series, those of the 5,7-dioxo-6,7-dihydro-5-thiazolo[3,2-α]pyrimidine series (e. g. 5,7-dioxo-3-phenyl-6,7-dihydro-5-thiazolo[3,2-α]pyrimidine etc.), those of the 2-thio-2,4-oxazolidinedione series (i. e. those of the 2-thio-2,4(3H,5H)-oxazoledione series) (e. g. 3-ethyl-2-thio-2,4-oxazolidinedione, etc.), those of the thianaphthenone series (e. g. 3-(2H)-thianaphthenone, etc.), those of the 2-thio-2,5-thiazolidinedione series (i. e. the 2-thio-2,5(3H, 4H)-thiazoledione series) (e. g. 3-ethyl-2-thio-2,5-thiazolidinedione, etc.), those of the 2,4-thiazolidinedione series (e. g. 2,4-thiazolidinedione, 3-ethyl-2,4-thiazolidinedione, 3-phenyl-2,4 - thiazolidinedione, 3 - α - naphthyl - 2,4 - thiazolidinedione, etc.), those of the thiazolidinone series (e. g. 4-thiazolidinone, 3-ethyl-4-thiazolidinone, 3-phenyl-4-thiazolidinone, 3-α-naphthyl-4-thiazolidinone, etc.), those of the 4-thiazolone series (e. g. 2-ethylmercapto-4-thiazolinone, 2-alkylphenylamino-4-thiazolinones, 2-diphenylamino-4-thiazolinone, etc.), those of the 2-imino-2,4-oxazolinone (i. e. pseudohydantoin) series, those of the 2,4-imidazolinedione (hydantoin) series (e. g. 2,4-imidazolinedione, 3 - ethyl - 2,4 - imidazolinedione, 3 - phenyl - 2,4-imidazolinedione, 3-α-naphthyl-2,4-imidazolinedione, 1,3 - diethyl - 2,4 - imidazolinedione, 1 - ethyl - 3 - phenyl - 2,4 - imidazolinedione, 1 - ethyl - 3 - α - naphthyl - 2,4 - imidazolinedione, 1,3 - diphenyl - 2,4 - imidazolinedione, etc.), those of the 2-thio-2,4-imidazolinedione (i. e. 2-thiohydantoin) series (e. g. 2-thio-2,4-imidazolinedione, 3-ethyl-2-thio-2,4-imidazolinedione, 3-phenyl-2-thio-2,4-imidazolinedione, 3-α-naphthyl-2-thio-2,4-imidazolinedione, 1,3-diethyl-2-thio-2,4-imidazolinedione, 1 - ethyl - 3 - phenyl - 2 - thio - 2,4 - imidazolinedione, 1 - ethyl - 3 - α - naphthyl - 2 - thio - 2,4 - imidazolinedione, 1,3 - diphenyl - 2 - thio - 2,4 - imidazolinedione, etc.), those of the 5-imidazolinone series (e. g. 2-n-propylmercapto-5-imidazolinone, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom).

The merocyanine (i. e. merocarbocyanine and merodicarbocyanine) dyes represented by Formula I above can advantageously be prepared by condsensing a cyclammonium quaternary salt selected from those represented by the following general formula:

II.

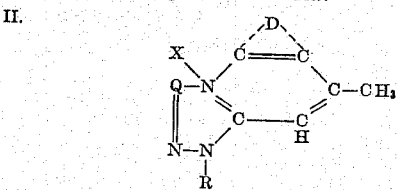

wherein R, D, and Q each have the values given above, and X represents an acid radical, such as benzenesulfonate, p-toluenesulfonate, ethylsulfate, methylsulfate, etc., together with a compound selected from those represented by the following general formula:

III.

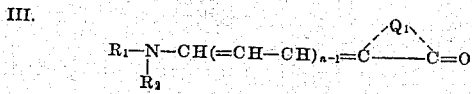

wherein $Q_1$ and $n$ each have the values given above, $R_1$ represents a hydrogen atom or an acyl group of a carboxylic acid, such as acetyl, propionyl, benzoyl, etc., and $R_2$ represents an aryl group, such as phenyl, tolyl, diphenyl, xylyl, naphthyl, etc. (e. g. a carboxylic aromatic group containing from 6 to 12 carbon atoms).

The condensations can advantageously be carried out in the presence of a basic condensing agent, e. g. the organic tertiary amines, such as triethylamine, tri-n-propylamine, triisopropylamine, tri-n-butylamine, etc., N-methylpiperidine, N-ethylpiperidine, N,N-dimethylaniline, N,N-diethylaniline, etc. The condensations can advantageously be effected in the presence of an inert solvent, e. g.

ethanol, n-propanol, isopropanol, 1,4-dioxane, pyridine, quinoline, etc. Heating accelerates the condensations, and temperatures varying from room temperature (about 20° C.) to the temperature of the steam bath can be advantageously used, although higher or lower temperatures can be used, if desired. For example, when a higher boiling solvent is used, it is possible to use higher temperatures.

The cyclammonium quaternary salts selected from those represented by Formula II above can advantageously be prepared by heating the corresponding free base, having the formula:

IV.

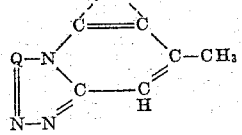

wherein D and Q have the values given above, together with an alkyl salt, e. g.

R—X wherein R and X each have the values given above. The free bases represented by Formula IV above can be prepared in accordance with the method described by Marckwald et al. in "Berichte" (1900), volume 33, pps. 1885–1899. This method comprises condensing together a compound selected from those represented by the following general formula:

V.

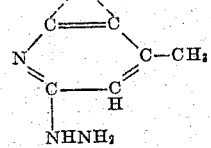

where D has the values given above, with anhydrous formic acid to give compounds where Q of Formula IV is methine (—CH=), or nitrous acid to give compounds where Q of Formula IV is a nitrogen atom.

The quaternation of the compounds of Formula IV can be effected by simply heating the free base (Formula IV) together with the alkyl salt on an oil bath or a steam bath until the mass sets to a solid (generally 10–60 hours). The cyclammonium quaternary salts of Formula II can have substituents on the carbocyclic ring, such as chlorine, bromine, hydroxyl, methoxyl, ethoxyl, methyl, ethyl, phenyl, etc.

The compounds of Formula III above wherein $n$ is 1 have been previously described by Dains et al. See, for example, "Jour. Am. Chem. Soc.," vol. 31 (1909), p. 1148; vol. 35 (1913), p. 959; vol. 38 (1916), p. 1841; vol. 40 (1918), p. 562; vol. 44 (1922), p. 2310; and "Berichte," vol. 35 (1902), p. 2496. The compounds of Formula III above wherein $n$ is 2 can be prepared as described in Van Lare and Brooker U. S. Patent 2,548,571, issued April 10, 1951.

The following examples will serve to illustrate more fully the manner whereby I prepare the merocyanine dyes represented by Formula I above.

*Example 1.—3-ethyl-5-[(3-ethyl-5(3H)-s-triazolo[4,3-a]quinolylidene) ethylidene]rhodanine*

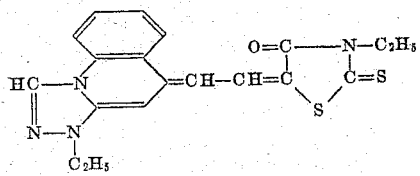

5-methyl-s-triazolo[4,3-a]quinoline (1.73 g., 1 mol.) and ethyl p-toluenesulfonate (4.0 g., 1 mol.+100% excess) were heated together for 20 hours on a steam bath. The melt was cooled and washed with ether. 5-acetanili- domethylene-3-ethylrhodanine (3.0 g., 1 mol.), pyridine (15 ml.) and triethylamine (1.0 g., 1 mol.) were added to the crude quaternary salt, and the mixture was refluxed for 20 minutes. The reaction mixture was cooled to 0° C., and the dye was filtered off and washed with ethyl alcohol. The crude dye was purified by dissolving it in pyridine and precipitating it with methyl alcohol. The final yield was 5% of the theoretical. The fine green needles melted at 262–263° C. dec.

*Example 2.—3-ethyl-5-[(3-ethyl-5(3H)-tetrazolo[a]-quinolylidene)-ethylidene]-2-thio-2,4-oxazolidinedione*

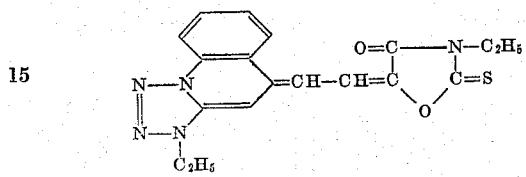

5-methyltetrazolo[a]quinoline (0.92 g., 1 mol.) and ethyl p-toluenesulfonate (2 g., 1 mol.+100% excess) were heated on a steam bath for 60 hours. The mixture was washed with ether to remove the excess ethyl p-toluenesulfonate and 5-acetanilidomethylene-3-ethyl-2-thio-2,4-oxazolidinedione (1.45 g., 1 mol.), pyridine (10 ml.) and triethylamine (0.5 g., 1 mol.) were added. The mixture was refluxed 20 minutes, the solution was cooled, and the separated solid filtered and washed with ethyl alcohol. A crude yield of 24% was obtained. The crude dye was dissolved in pyridine and precipitated with methyl alcohol. The pure dye was obtained in an 11% yield as lustrous green crystals, M. P. 238–239° C. dec.

*Example 3.—3-ethyl-5-[(3-methyl-5(3H)-s-triazolo[4,3-a]-quinolylidene)ethylidene)]rhodanine*

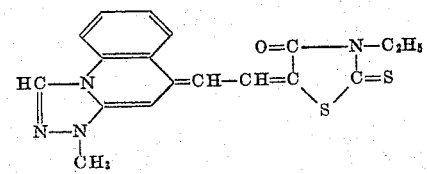

5-methyl-s-triazolo[4,3-a]quinoline (1.73 g., 1 mol.) and methyl p-toluenesulfonate (4.0 g., 1 mol.+115% excess) were heated together for 20 hours on a steam bath. The melt was cooled and washed with ether. 5-acetanilidomethylene-3-ethylrhodanine (3.0 g., mol.), pyridine (15 ml.) and triethylamine (1.0 g., 1 mol.) were added to the crude quaternary salt, and the mixture was refluxed for 20 minutes. The reaction mixture was cooled to 0° C., and the dye was filtered off and washed with methyl alcohol. The crude dye was purified by dissolving it in pyridine and precipitating it with methyl alcohol. The final yield of dye was 4% of the theoretical. The brownish crystals melted at 273–274° C. dec.

*Example 4.—1,3-diethyl-5[(3-ethyl-5(3H)-tetrazolo[a]-quinolylidene)ethylidene]-2-thiobarbituric acid*

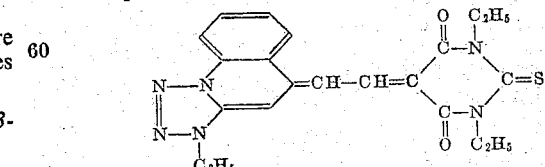

5-methyltetrazolo[a]quinoline (0.92 g., 1 mol.) and ethyl-p-toluenesulfonate (2 g., 1 mol.) were heated together on a steam bath for 60 hours. The mixture was washed with ether to remove excess ethyl p-toluenesulfonate and 5-acetanilidomethylene-1,3-diethyl-2-thiobarbituric acid (1.86 g., 1 mol.), pyridine (10 ml.) and triethylamine (0.5 g., 1 mol.) were added. The mixture was refluxed for 20 minutes, the solution was chilled and the solid filtered off and washed with methyl alcohol. The colorless solid was discarded. The filtrate was treated with ether and the ether layer decanted. The oily layer was washed with ether, and then treated with water. The solid was filtered off and washed with water. A crude yield of 21% was obtained. The dye was purified by crystallization from methyl alcohol to give dark brownish crystals in an 8% yield, M. P. 252–253° C. dec.

*Example 5.—3-ethyl-5-[(3-ethyl-5(3H)-tetrazolo[a]-quinolylidene)ethylidene]rhodanine*

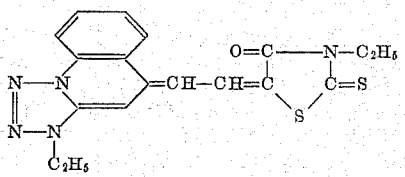

5-methyltetrazolo[a]quinoline (0.92 g., 1 mol.) and ethyl p-toluenesulfonate (1.5 g., 1 mol.+50% excess) were heated together at 140° C. for 17 hours. 5-acetanilidomethylene-3-ethylrhodanine (1.5 g., 1 mol.), triethylamine (1.1 g., 1 mol. +120% excess) and ethyl alcohol (15 ml.) were added to the crude quaternary salt and the mixture was refluxed for 20 minutes. The reaction mixture was cooled to 0° C. The dye was filtered off and washed with ethyl alcohol, then with hot water, and then with methyl alcohol. After two recrystallizations from nitromethane (80 ml./gram), the minute green needles melted at 231–233° C. dec.

*Example 6.—4-[(3-ethyl-5(3H)-tetrazolo[a]quinolylidene)-ethylidene]-3-phenyl-5(4H)-isoxazolone*

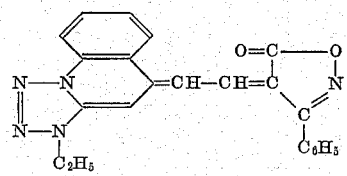

5-methyltetrazolo[a]quinoline (0.92 g., 1 mol.) and ethyl p-toluenesulfonate (2 g., 1 mol. +100% excess) were heated on a steam bath for 60 hours. The mixture was washed with ether to remove excess ethyl p-toluenesulfonate and 4-acetanilidomethylene-3-phenyl-5-(4H)-isoxazolone (1.5 g., 1 mol.) were added. The mixture was refluxed for 20 minutes, the solution was chilled and the solid filtered off and washed with methyl alcohol. A crude yield of 42% was obtained. After two recrystallizations from ethyl alcohol, the pure dye was obtained in a 25% yield as lustrous green crystals, M. P. 267–268° C. dec.

*Example 7.—3-ethyl-5-[(3-methyl-5(3H)-tetrazolo[a]-quinolylidene)ethylidene]rhodanine*

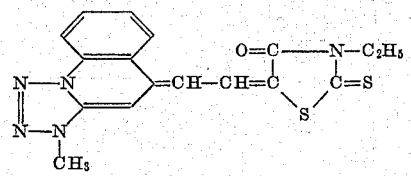

5-methyltetrazolo[a]quinoline (0.92 g., 1 mol.) and methyl p-toluenesulfonate (2.0 g., 1 mol. +100% excess) were heated together for 16 hours on a steam bath. The melt was cooled and washed with ether. 5-acetanilidomethylene-3-ethylrhodanine (1.5 g., 1 mol.), pyridine (15 ml.) and triethylamine (0.5 g., 1 mol.) were added to the crude quaternary salt, and the mixture was refluxed for 20 minutes. The reaction mixture was cooled and the crude dye was filtered off and washed with ethyl alcohol. The crude dye was purified by dissolving it in pyridine and precipitating it with methyl alcohol. The yield of dye was 58% of the theoretical. The lustrous green needles melted at 207–208° C. dec.

*Example 8.—4[4-(3-ethyl-5(3H)-tetrazolo[a]quinolylidene)-2-butenylidene]-3-phenyl-5-isoxazolone*

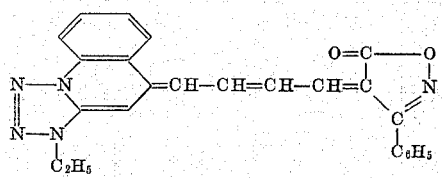

5-methyltetrazolo[a]quinoline (1.07 g., 1 mol.) and ethyl sulfate (1.54 g., 1 mol. plus 100 percent excess) were heated together over a free flame until melt was formed and then heating was continued on a steam bath for 24 hours. The mixture was washed with ether to remove the excess ethyl sulfate. The residue, 4-(3-acetanilidoallylidene)-3-phenyl-5-isoxazolone (1.66 g., 1 mol.), pyridine (15 ml.), and triethylamine (0.5 g., 1 mol.) were heated together at the refluxing temperature for 5 minutes. The reaction mixture was diluted with methyl alcohol (200 ml.), chilled overnight, and filtered. The crude dye was dissolved in hot pyridine and precipitated with methyl alcohol. The yield of dye was 19 percent crude and 2 percent after purification. The dark-blue crystals melted at 239–240° C. with decomposition.

*Example 9.—1,3-diethyl-5-[4-(3-ethyl-5(3H)-tetrazolo[a]quinolylidene)-2-butenylidene]-2-thiobarbituric acid*

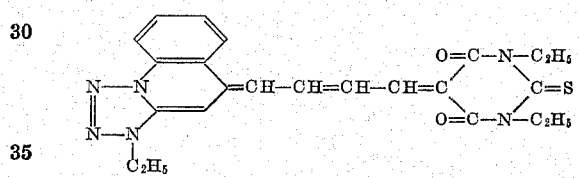

5-methyltetrazolo[a]quinoline (0.71 g., 1 mol.) and ethyl p-toluenesulfonate (1.33 g., 1 mol. plus 100 percent excess) were heated together over a free flame until a melt was formed and then heating was continued on a steam bath for 48 hours. The mixture was washed with ether to remove the excess ethyl p-toluenesulfonate. The residue, 5-(3-acetanilidoallylidene)-1,3-diethyl-2-thiobarbituric acid (1.23 g., 1 mol.), pyridine (15 ml.), and triethylamine (0.34 g., 1 mol.) were heated together at the refluxing temperature for 20 minutes. The reaction mixture was diluted with methyl alcohol (150 ml.), chilled for two hours, and filtered. A crude yield of 26 percent was obtained. The crude dye was dissolved of hot pyridine and precipitated with methyl alcohol. The yield of purified dye was 20 percent and the dark purplish crystals melted at 201–202° C. with decomposition.

The following example illustrates the method described by Marckwald et al. of preparing intermediates selected from those represented by Formula IV above.

*Example 10.—5-methyl-s-triazolo[4,3-a]quinoline*

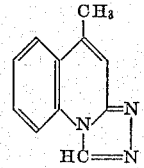

4-methyl-2-quinolylhydrazine (7.80 g.), from 2-chlorolepidine and hydrazine hydrate in ethyl alcohol, and formic acid (25 ml.) were heated together at the refluxing temperature for one hour, and then the excess formic acid was removed under reduced pressure. The residue was dissolved in ethyl alcohol (50 ml.) and the solution was made alkaline with 10 percent aqueous potassium carbonate. After chilling, the product was collected on a filter and washed with water. The yield was 7.9 g. (96 percent). The buff needles from benzene melted at 228–230° C. with decomposition.

Other intermediates selected from those represented by Formula IV above can be prepared in a similar manner by reacting an intermediate selected from those represented by Formula V together with formic acid or nitrous acid.

Other merocyanine dyes, which can also be used to sensitize photographic emulsions, include those of the following two examples.

*Example 11.—3-ethyl-5-(1-phenacyl-4(1H)-pyridylidene)-rhodanine*

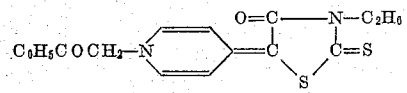

4-phenylmercaptopyridine (1.9 g., 1 mol.) and phenacyl bromide (2.0 g., 1 mol.) were heated together in dry benzene solution (25 ml.) on a steam bath for one hour. After cooling, the product was collected on a filter and washed with benzene. This quaternary salt, 3-ethylrhodanine (2.0 g., 1 mol. plus 25 percent excess), ethyl alcohol (15 ml.) and triethylamine (2.0 g., 1 mol. plus 100 percent excess) were heated at the refluxing temperature for 20 minutes. The reaction mixture was chilled, filtered and the residue was washed with ethyl alcohol and then water. The yield of dye was 30 percent crude. The dye was purified by dissolving it in hot pyridine and precipitating it with methyl alcohol. The yield of purified dye was 17 percent. The light-brown crystals melted at 270–272° C. with decomposition.

*Example 12.—2-dicyanomethylene-3-ethyl-5-(1-ethyl-4-(1H)-pyridylidene)-4-thiazolidinone*

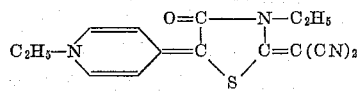

3 - ethyl - 5 - (1 - ethyl - 4(1H) - pyridylidene)-rhodanine (1.33 g., 1 mol.) and methyl p-toluenesulfonate (4.0 g.) were heated together on a steam bath for 30 minutes. After removing the excess methyl p-toluenesulfonate with ether, malononitrile (0.7 g., 1 mol. plus 100 percent excess), ethyl alcohol (20 ml.) and triethylamine (1.0 g., 1 mol. plus 100 percent excess) were added to the residue. The reaction mixture was refluxed 20 minutes, chilled, filtered and the residue was washed with methyl alcohol. The yield of crude dye was 96 percent. The dye was purified by dissolving it in hot pyridine and precipitating it with methyl alcohol. The yield of purified dye was 83 percent. The orange needles melted at 270–271° C. with decomposition.

The new dyes of my invention are useful in spectrally sensitizing photographic silver halide emulsions when incorporated therein. The dyes are especially useful for extending the spectral sensitivity of the customarily employed gelatino silver chloride, gelatino silver chlorobromide, gelatino silver bromide, gelatino silver bromiodide, and gelatino silver chlorobromiodide developing-out emulsions. To prepare emulsions sensitized with one or more of my new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Pyridine or acetone has proved satisfactory as a solvent for most of my new dyes. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver halide emulsion sensitized with one or more of my new dyes, the following procedure is satisfactory:

A quantity of dye is dissolved in pyridine or acetone (or a mixture of acetone and pyridine) and a volume of this solution, which may be diluted with water, containing from 5 to 100 mg. of dye, is slowly added to about 1000 cc. of gelatino-silver halide emulsion, with stirring. Stirring is continued until the dye is uniformly dispersed in the emulsion.

With most of my dyes, from 10 to 20 mg. of dye per liter of gelatino-silver bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of my invention can also contain such addenda as chemical sensitizers (e. g. sulfur sensitizers, such as allyl thiocarbamide, thiourea, allylisothiocyanate, cystine, etc.), various gold compounds, such as potassium chloroaurate, auric trichloride, etc. (see U. S. Patents 2,540,085; 2,597,856; and 2,597,915, for example), various palladium compounds (such as palladium chloride (U. S. 2,540,086), potassium chloropalladate (U. S. 2,598,079), etc.), etc., or mixtures of such sensitizers), antifoggants (e. g. benzotriazole, nitrobenzimidazole, 5-nitroindazole, etc. (see Mees, "The Theory of the Photographic Process," Macmillan Pub., pg. 460), or mixtures thereof), hardeners (e. g. formaldehyde (U. S. 1,763,533), chrome alum (U. S. 1,763,-533), glyoxal (Ger. 538,713), dibromacrolein (Br. 406,750), etc.), color couplers (e. g. such as those described in U. S. Patent 2,423,730, Spence and Carroll U. S. application 771,380, filed August 29, 1947, now U. S. Patent 2,640,776, issued June 2, 1953, etc.), or mixtures of such addenda. Dispersing agents for color couplers, such as substantially water-insoluble, high boiling crystalloidal materials, such as those set forth in U. S. Patents 2,322,027 and 2,304,940, can also be employed in the above-described emulsions.

What I claim as my invention and desire secured by Letters Patent of the United States is:

1. A merocyanine dye selected from those represented by the following general formula:

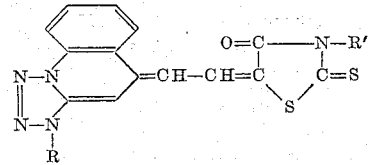

wherein R and R' each represents a lower alkyl group.

2. A merocyanine dye selected from those represented by the following general formula:

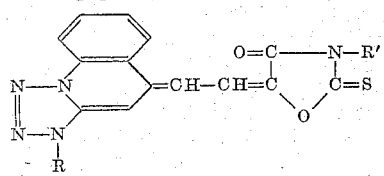

wherein R and R' each represents a lower alkyl group.

3. A merocyanine dye selected from those represented by the following general formula:

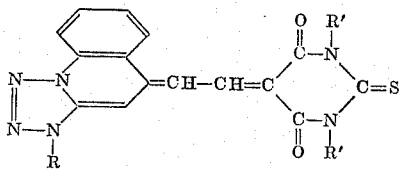

wherein R and R' each represents a lower alkyl group.

4. A merocyanine dye selected from those represented by the following general formula:

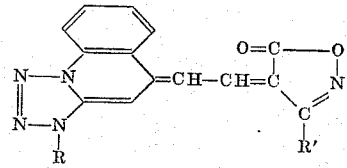

wherein R represents a lower alkyl group and R' represents an aryl group of the benzene series.

5. A merocyanine dye selected from those represented by the following general formula:

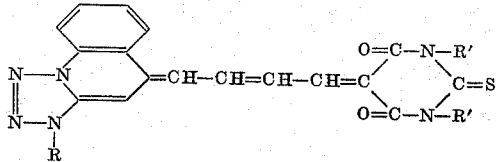

wherein R and R' each represents a lower alkyl group.

6. The merocyanine dye having the following formula:

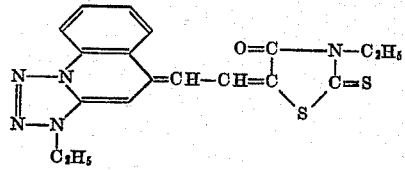

7. The merocyanine dye having the following formula:

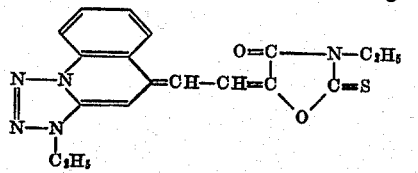

8. The merocyanine dye having the following formula:

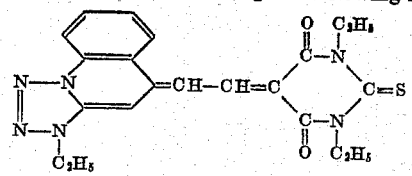

9. The merocyanine dye having the following formula:

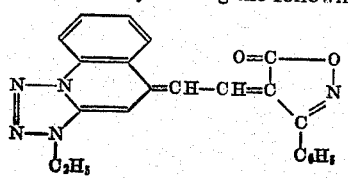

10. The merocyanine dye having the following formula:

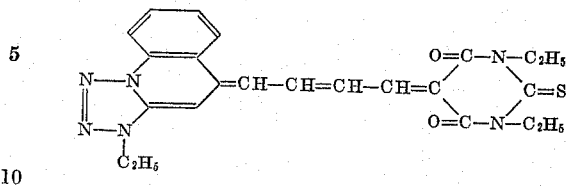

11. A process for making merocyanine dyes comprising condensing a compound selected from those represented by the following general formula:

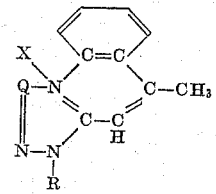

wherein R represents an alkyl group, X represents an acid radical, and Q represents a member selected from the group consisting of a nitrogen atom and a methine group, together with a compound selected from those represented by the following general formula:

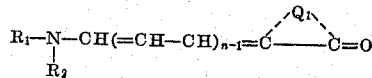

wherein $R_1$ represents a member selected from the group consisting of a hydrogen atom and an acyl group of a carboxylic acid, $R_2$ represents an aryl group, $n$ represents a positive integer of from 1 to 2, and $Q_1$ represents the non-metallic atoms necessary to complete a heterocyclic nucleus containing from 5 to 6 atoms in the heterocyclic ring.

12. A process as defined in claim 11 wherein the condensation is carried out in the presence of a basic condensing agent.

13. A process as defined in claim 12 wherein the basic condensing agent is triethylamine.

14. A merocyanine dye selected from those represented by the following general formula:

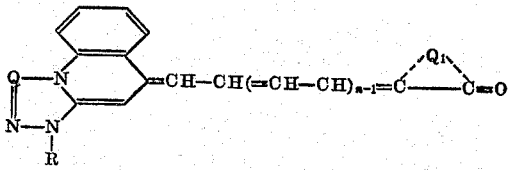

wherein R represents an alkyl group containing from 1 to 2 carbon atoms, $n$ represents a positive integer of from 1 to 2, Q represents a member selected from the group consisting of a nitrogen atom and a methine group, and $Q_1$ represents the non-metallic atoms necessary to complete a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom.

No references cited.